(12) United States Patent
Ueshima et al.

(10) Patent No.: US 9,487,846 B2
(45) Date of Patent: Nov. 8, 2016

(54) ELECTROCONDUCTIVE BONDING MATERIAL

(71) Applicant: Senju Metal Industry Co., Ltd., Tokyo (JP)

(72) Inventors: Minoru Ueshima, Tokyo (JP); Isamu Osawa, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 14/424,679

(22) PCT Filed: Aug. 30, 2013

(86) PCT No.: PCT/JP2013/073356
§ 371 (c)(1),
(2) Date: Jul. 8, 2015

(87) PCT Pub. No.: WO2014/034863
PCT Pub. Date: Mar. 6, 2014

(65) Prior Publication Data
US 2016/0010179 A1 Jan. 14, 2016

(30) Foreign Application Priority Data
Aug. 31, 2012 (JP) ................................ 2012-192010

(51) Int. Cl.
*B32B 15/04* (2006.01)
*B32B 17/06* (2006.01)
(Continued)

(52) U.S. Cl.
CPC ............ *C22C 13/00* (2013.01); *B23K 1/0006* (2013.01); *B23K 1/06* (2013.01); *B23K 1/19* (2013.01); *B23K 3/02* (2013.01); *B23K 35/26* (2013.01); *B23K 35/262* (2013.01); *H01B 1/02* (2013.01)

(58) Field of Classification Search
USPC ....... 428/426, 428, 688, 689, 697, 698, 699, 428/701, 702, 432
See application file for complete search history.

(56) References Cited

U.S. PATENT DOCUMENTS

| | | | |
|---|---|---|---|
| 6,224,690 B1 | 5/2001 | Andricacos et al. | |
| 6,241,942 B1 | 6/2001 | Murata et al. | |

(Continued)

FOREIGN PATENT DOCUMENTS

| | | | |
|---|---|---|---|
| EP | 0855242 A1 | 7/1998 | |
| EP | 0875331 A2 | 11/1998 | |

(Continued)

OTHER PUBLICATIONS

JP2011005510 English machine translation.*
(Continued)

*Primary Examiner* — Lauren R Colgan
(74) *Attorney, Agent, or Firm* — The Webb Law Firm

(57) ABSTRACT

An electroconductive bonding material which has a high bonding strength to an inorganic nonmetal such as glass or a ceramic and which has excellent reliability in that it does not undergo peeling even when exposed to a high temperature has an alloy composition which comprises, in mass %, Zn: 0.1-15%, In: 2-16%, Sb: greater than 0% to at most 2%, optionally one or both of Ag: at most 2% and Cu: at most 1%, optionally at least one element selected from the group consisting of Ba, Ti, and Ca in a total amount of 0.01-0.15%, and a remainder of Sn. This electroconductive bonding material peels off when it is heated to at least its melting point and can be reused.

8 Claims, 1 Drawing Sheet

(51) Int. Cl.
*C22C 13/00* (2006.01)
*B23K 35/26* (2006.01)
*H01B 1/02* (2006.01)
*B23K 1/00* (2006.01)
*B23K 1/06* (2006.01)
*B23K 1/19* (2006.01)
*B23K 3/02* (2006.01)

(56) References Cited

U.S. PATENT DOCUMENTS

| | | | |
|---|---|---|---|
| 6,280,858 | B1 | 8/2001 | Teshima |
| 7,681,777 | B2 * | 3/2010 | Hirata ............... B23K 35/262 228/56.3 |
| 2003/0007885 | A1 | 1/2003 | Domi et al. |
| 2005/0079092 | A1 | 4/2005 | Ochi et al. |
| 2006/0261131 | A1 | 11/2006 | Hirata et al. |

FOREIGN PATENT DOCUMENTS

| | | | |
|---|---|---|---|
| EP | 1614500 A1 | | 1/2006 |
| JP | 994687 A | | 4/1997 |
| JP | 2000141078 | * | 5/2000 |
| JP | 2000141078 A | | 5/2000 |
| JP | 2001200323 A | | 7/2001 |
| JP | 200482199 A | | 3/2004 |
| JP | 200830047 A | | 2/2008 |
| JP | 2011-005510 | * | 1/2011 |
| JP | 201131253 A | | 2/2011 |
| JP | 2011235294 | * | 11/2011 |
| JP | 2012121047 A | | 6/2012 |

OTHER PUBLICATIONS

JP2011235294 English machine translation.*
JP2000141078 English machine translation.*
Abtew et al., "Lead-free Solders in Microelectronics", Materials Science and Engineering Reports: A Review Journal, 2000, vol. 27, pp. 95-141.
Lanin, "Ultrasonic soldering in electronics", Ultrasonics:Sonochemistry, 2001, vol. 8, No. 4, pp. 379-385.

* cited by examiner

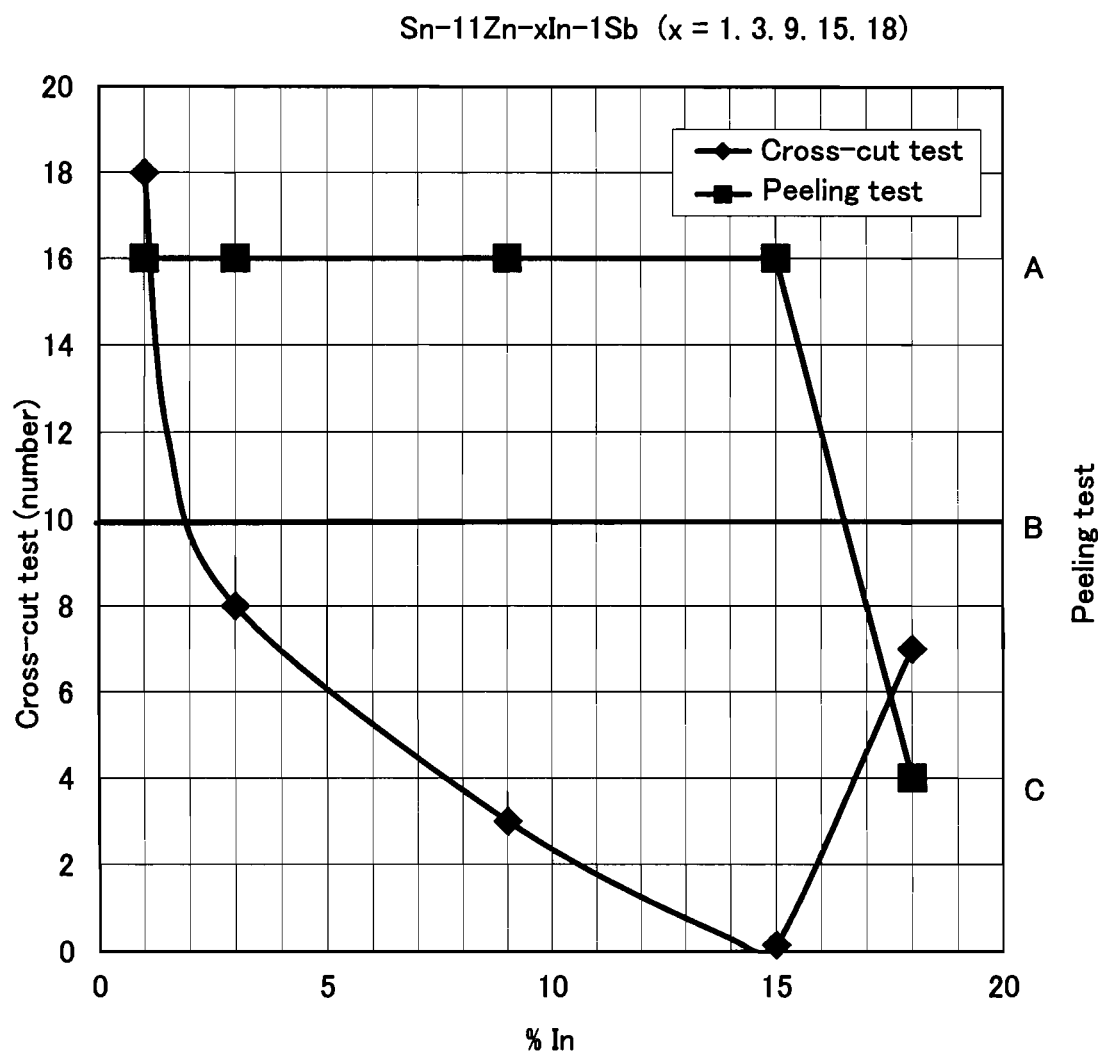

ELECTROCONDUCTIVE BONDING MATERIAL

CROSS-REFERENCE TO RELATED APPLICATIONS

This application is the United States national phase of International Application No. PCT/JP2013/073356 filed Aug. 30, 2013, and claims priority to Japanese Patent Application No. 2012-192010 filed Aug. 31, 2012, the disclosure of which are hereby incorporated in their entirety by reference.

BACKGROUND OF THE INVENTION

1. Field of the invention

This invention relates to a Sn—Zn—In—Sb based electroconductive bonding material and particularly a Sn—Zn—In—Sb based electroconductive bonding material which can directly adhere to an inorganic nonmetal such as glass or a ceramic. In the present invention, a bonding material means a material which maintains its adhesive force after being bonded to the surface of a substrate, but which can intentionally be peeled off without contaminating the bonded interface when it is subjected to specific treatment such as heating. An electroconductive bonding material according to the present invention is an alloy, so it is bonded to the surface of a substrate by melting in the same manner as solder.

2. Background Art

Among lead-free solder alloys which have been put to practical use in recent years, Sn—Ag—Cu solder alloys are widely used. A Sn—Ag—Cu solder alloy is bonded to an electrode by producing mutual diffusion of Sn in the solder alloy and Cu in the electrode and forming an intermetallic compound. Because this type of conventional lead-free solder alloy performs bonding to a Cu electrode through the formation of an intermetallic compound, it has a high bonding strength.

There is a demand for decreases in the size of recent electronic equipment, and electronic parts used in such equipment are also required to be reduced in size. Due to decreases in the size of electronic parts, it is also necessary to decrease the size of solder joints. Therefore, the amount of a solder alloy used in solder joints is decreased, and the bonding strength of solder joints decreases. Accordingly, there is a desire for an increase in the bonding strength of solder joints. Depending upon the electronic equipment, the material of a portion to which a solder joint is to be bonded is not a metal such as Cu or Ni but is sometimes an inorganic nonmetal such as glass or a ceramic. A high bonding strength is of course required even when soldering is performed to an inorganic nonmetal.

With a conventional Sn—Ag—Cu solder alloy, when the material of a portion to be bonded is an inorganic nonmetal such as glass or a ceramic, the elements constituting the inorganic nonmetal and the elements constituting the solder alloy do not undergo mutual diffusion, so there is no substantial formation of an intermetallic compound. As a result, it is difficult to join an Sn—Ag—Cu solder alloy to an inorganic nonmetal. Even if it is attempted to bond an Sn—Ag—Cu solder alloy to an inorganic nonmetal while applying ultrasonic waves, the Sn—Ag—Cu solder alloy easily peels off the portion to which bonding took place.

A Sn—Zn solder alloy is sometimes used as a lead-free solder for bonding to an inorganic nonmetal. Compared to a Sn—Ag—Cu solder alloy, a Sn—Zn solder alloy has relatively good wettability with respect to an inorganic nonmetal. However, Sn and Zn scarcely form a solid solution with each other, and each element forms a phase of the individual element in a solder alloy. Therefore, when an external stress is applied, stress easily concentrates in the Sn phase, and the strength of the solder alloy decreases, leading to a deterioration in bonding strength.

As an example of a countermeasure to such a deterioration in bonding strength, increasing bonding strength to an inorganic nonmetal by using a soldering iron which applies ultrasonic waves and adding In, Sb, or the like to a Sn—Zn solder alloy is being investigated in Patent Document 1.

PRIOR ART DOCUMENTS

Patent Documents

Patent Document 1: JP 2004-082199 A

SUMMARY OF THE INVENTION

Problem which the Invention is to Solve

Among the solder alloys studied in the examples of Patent Document 1, because the solders which contain all of Sn, Zn, In, and Sb have an In content of at least 18%, their bonding strength is degraded. When a certain amount of In is added to a solder alloy, it forms a γ-In phase or a γ-SnIn phase. When an external stress is applied, stress concentrates in these phases, and the strength of the solder alloy itself is degraded. In this manner, a solder alloy containing at least 18% of In has problems with respect to reliability. This means that major problems such as fracture of the bonded interface may occur in a normal environment of use.

In general, substrates and the like on which electrodes are formed are again exposed to a high temperature of around 150° C. for molding or similar purpose in subsequent steps while various molding resins are supplied. If a molding resin or a solvent component adheres to the surface of a solder joint, in the case of the solder alloy disclosed in Patent Document 1, the bonding strength between an inorganic nonmetal and the solder alloy markedly decreases, and it is sometimes impossible to achieve satisfactory reliability in a peeling test.

Thus, although Patent Document 1 specifically discloses a Sn—Zn—In—Sb based solder alloy, the In content is not suitable. Therefore, even if the solder alloy disclosed in Patent Document 1 has sufficient bonding strength in the test disclosed in Patent Document 1, under the conditions in which solder joints are reduced in size due to reductions in the size of recent electronic parts, it is unlikely that a sufficient bonding strength can be obtained when the amount of a solder alloy which is used is reduced due to decreases in size. In addition, the reliability of the bonded interface of the resulting film when exposed to a high temperature decreases.

An object of the present invention is to provide a Sn—Zn—In—Sb based electroconductive bonding material which has a high bonding strength to inorganic nonmetals and excellent reliability such as peeling resistance when exposed to high temperatures and which can be used for bonding to glass and other inorganic nonmetals having low resistance to thermal shocks.

Means for Solving the Problem

It has been thought necessary to form an intermetallic compound in conventional solder bonding to a metal surface. In contrast, the present inventors diligently investigated the concept of adhering an electroconductive bonding material to an inorganic nonmetal primarily by the action of van de Waals force between an electroconductive bonding material and an inorganic nonmetal by improving the wettability of the bonding material. This was for the following reasons.

Among inorganic nonmetals and particularly glass and oxide-type ceramics, oxygen and other elements are bonded primarily by covalent bonds. Therefore, bonding by metallic bonds between the components of an electroconductive bonding material and Cu, such as occurs in bonding to Cu or other metal, does not take place. In addition, glass or a ceramic has a high melting point (or softening point) and does not melt or soften at around 200° C., which is the temperature at which soldering is typically carried out. For example, the softening point of quartz glass is around 1600° C., which is much higher than the melting point of an electroconductive bonding material. In other words, glass does not soften at a temperature near the melting temperature of an electroconductive bonding material. Therefore, even if it is possible to form a chemical bond between an electroconductive bonding material and an inorganic nonmetal, the region in which bonding takes places by chemical bonding does not extend over the entire bonded interface but is thought to be limited to just a portion of the interface. In this case, the bonding strength becomes extremely low in some locations, and it is not possible to obtain a uniform bonding strength over the entire bonded interface.

As a result of investigating the In content of a Sn—Zn—In—Sb based solder alloy, the present inventors found that bonding strength is enormously increased by optimizing the In content so as to improve the wettability of an electroconductive bonding material to an inorganic nonmetal and increase the strength of the electroconductive bonding material itself. In addition, they found that optimizing the In content makes it difficult for peeling of an electroconductive bonding material to take place even when the bonding material is exposed to a high temperature, and the reliability of a bonding portion is increased. As a result, they completed the present invention.

The present invention is as follows.

(1) An electroconductive bonding material characterized by having an alloy composition consisting essentially, in mass %, of Zn: 0.1-15%, In: 2-16%, Sb: greater than 0% to at most 2%, Ag: 0-2%, Cu: 0-1%, at least one element selected from the group consisting of Ba, Ti, and Ca in a total amount of 0-0.15%, and a remainder of Sn (2) An electroconductive bonding material as set forth above in (1) containing, in mass %, at least one of Ag: 0.1-2% and Cu: 0.1-1%.

(3) An electroconductive bonding material as set forth above in (1) or (2) containing, in mass %, at least one element selected from the group consisting of Y, Ba, Ti, and Ca in a total amount of 0.01-0.15%.

(4) The use of an electroconductive bonding material as set forth above in any one of (1)-(3) for connection to an inorganic nonmetal.

(5) A film formed from an electroconductive bonding material as set forth above in any one of (1)-(3).

(6) A film as set forth above in (5) which adheres to the surface of an inorganic nonmetal.

(7) A bonding method characterized by using an electroconductive bonding material as set forth above in any one of (1)-(3).

(8) A method as set forth above in (7) wherein the object to which bonding takes place is an inorganic nonmetal.

(9) A method as set forth above in (7) or (8) wherein bonding is carried out by applying ultrasonic waves while melting the electroconductive bonding material.

In the present invention, an electroconductive bonding material means an electrically conductive material which has the property that after the metallic material is bonded to a substrate by melting, it can be peeled off the substrate without contaminating the bonded interface by carrying out specified treatment such as heating on the bonded interface. Without contaminating means that a metallic film of the electroconductive bonding material does not remain on the bonded interface after peeling.

Effects of the Invention

An electroconductive bonding material according to the present invention has excellent bonding strength to an inorganic nonmetal and minimized decrease in bonding strength after exposure to high temperatures, so it can perform bonding to an inorganic nonmetal surface with high reliability. Bonding between this electroconductive bonding material and an inorganic nonmetal is primarily by the action of van de Waals force, so the electroconductive bonding material can be peeled off without contaminating the bonded interface by heating it to a temperature of at least the melting point of the electroconductive bonding material. In addition, an electroconductive bonding material according to the present invention can be peeled off when not needed, so it has excellent recyclability and is gentle on the environment.

BRIEF DESCRIPTION OF THE DRAWING

FIG. 1 is a graph showing the relationship between the In content and the results of a cross-cut test and a peeling test.

DETAILED DESCRIPTION OF THE INVENTION

Below, the present invention will be explained in greater detail. In this description, % with respect to the alloy composition of an electroconductive bonding material means mass % unless otherwise specified.

Due to the combination of the electroconductive bonding material having excellent wettability with respect to an inorganic nonmetal and the material itself having a high strength, the bonding strength to an inorganic nonmetal of an electroconductive bonding material according to the present invention is enormously increased.

An increase in the wettability of an electroconductive bonding material leads to an increase in the contact surface area between the electroconductive bonding material and an inorganic nonmetal. By increasing the contact surface area the strength of van de Waals force, which is the principal force acting between the electroconductive bonding material and the inorganic nonmetal, increases. As a result, the bonding strength between the electroconductive bonding material and the inorganic nonmetal increases.

If the strength of the electroconductive bonding material itself is low, the electroconductive bonding material easily deforms under an external stress. As a result, when squares of a grid of an electroconductive bonding material which are formed in a cross-cut test are peeled off, due to deformation of the squares, stress concentrates in the deformed locations, and the electroconductive bonding material easily peels off. If the strength of the electroconductive bonding material is high, when squares are peeled off in a cross-cut test, the stress which is applied to the squares is dispersed, so a high bonding strength is exhibited.

An electroconductive bonding material according to the present invention has an alloy composition comprising Zn: 0.1-15%, In: 2-16%, Sb: greater than 0 to at most 2%, optionally one or both of Ag: at most 2% and Cu: at most 1%, at least one element selected from the group consisting of Ba, Ti, and Ca in a total amount of 0.01-0.15%, and a remainder of Sn.

The content of Zn is 0.1-15%. Zn increases the strength of an electroconductive bonding material, and it suppresses curling up of an electroconductive bonding material, thereby increasing wettability with respect to an inorganic nonmetal. If the Zn content is less than 0.1%, the strength of an electroconductive bonding material deteriorates, and it easily peels from an inorganic nonmetal. If the Zn content is greater than 15%, the liquidus temperature of the alloy becomes high, and when bonding is carried out at a high temperature at which the electroconductive bonding material melts, particularly when the portion to which the electroconductive bonding material is being bonded is a material such as glass having relatively low resistance to thermal damage, thermal damage may occur. The Zn content is preferably 0.1-14% and more preferably 0.2-11%.

The In content is 2-16%. In lowers the melting point of an electroconductive bonding material, and it increases the uniformity of the structure of Sn in the electroconductive bonding material, thereby increasing the strength of the electroconductive bonding material. If the In content is less than 2%, the strength of the electroconductive bonding material deteriorates and the liquidus temperature does not decrease. If the In content is greater than 16%, a γ-In phase or a γ-SnIn phase is formed. The mechanical properties of these phases are markedly different, and at a high temperature, diffusion of atoms at the grain boundaries becomes active, so a phase transformation easily takes place. As a result, gaps develop between the electroconductive bonding material and the inorganic nonmetal, the bonding force greatly decreases, and the reliability of bonding in a high-temperature environment deteriorates. The In content is preferably 2-15% and more preferably 3-9%.

The Sb content is greater than 0% to at most 2%. Sb increases the wettability of an electroconductive bonding material and increases the strength of the electroconductive bonding material itself. If the Sb content is greater than 2%, ZnSb compounds are formed, thereby markedly increasing the liquidus temperature of the alloy and worsening wettability, so bonding to an inorganic nonmetal can no longer take place. The Sb content is preferably at most 1.5%, more preferably at most 1%, and still more preferably at most 0.5%. Sb dissolves in Sn to around 0.5% and precipitates Sn—Sb intermetallic compounds from a supersaturated solid solution. As a result of precipitation strengthening due to this precipitation, it is possible to increase the strength of an electroconductive bonding material. Therefore, the Sb content is preferably at least 0.1% and more preferably at least 0.2%.

The alloy composition of an electroconductive bonding material according to the present invention may consist solely of Sn, Zn, In, and Sb, but it is possible for it to contain one or more of the optional elements explained below.

Ag may be contained in an electroconductive bonding material according to the present invention in order to increase the strength of the electroconductive bonding material. In order to obtain this effect, the Ag content is preferably at most 2%. There is no particular lower limit on the Ag content, but in order to obtain the above-described effect with certainty, the Ag content is preferably at least 0.1%. The upper limit on the Ag content is preferably 1%.

In the same manner as Ag, Cu may be contained in an electroconductive bonding material according to the present invention in order to increase the strength of the electroconductive bonding material. In order to obtain this effect, the content of Cu is preferably at most 1%. There is no particular lower limit on the Cu content, but in order to obtain the above-described effect with certainty, the Cu content is preferably at least 0.1%. The upper limit on the Cu content is preferably 0.8%, and the Cu content is more preferably 0.1-0.5%.

Y, Ba, Ti, and Ca each suppress curling up of an electroconductive bonding material and increase wettability, so they may be contained in an electroconductive bonding material according to the present invention. In order to obtain this effect, the total content of Y, Ba, Ti, and Ca is preferably 0.01-0.15%, more preferably 0.03-0.12%, and particularly preferably 0.03-0.1%.

There is no particular limitation on the form of an electroconductive bonding material according to the present invention. It can be in a desired form convenient for use such as a wire, a ball, a powder, a pellet, a preform, a rod, a clump, or the like.

An electroconductive bonding material according to the present invention is preferably used as an electroconductive bonding material for connection to an inorganic nonmetal. The inorganic nonmetal is preferably glass or a ceramic and more preferably it is glass. The term ceramic typically indicates all pottery, but in the present invention, there is no particular limitation on a ceramic as long as the main component is a metal oxide. Glass usually indicates a material having an amorphous single-phase structure, but in the present invention, it includes materials which do not have an amorphous single-phase structure such as crystallized glass. An electroconductive bonding material according to the present invention is primarily used for bonding of oxide-type transparent electrodes which are formed atop semiconductor elements such as silicon substrates, or for bonding to ground antistatic materials or electromagnetic shielding materials for displays.

A bonding method using an electroconductive bonding material according to the present invention is one in which an electroconductive bonding material according to the present invention is applied by rubbing on an inorganic nonmetal using a soldering iron which applies ultrasonic vibrations to perform bonding while removing oxides or contamination which was adhered to the electroconductive bonding material and removing air bubbles present between the electroconductive bonding material and the inorganic nonmetal. Bonding conditions such as the temperature of the soldering iron and the frequency of the ultrasonic vibrations when using an electroconductive bonding material according to the present invention are not special, and typical conditions can be used.

A film according to the present invention is a film formed from an electroconductive bonding material according to the present invention by adhering to an inorganic nonmetal so as to cover the nonmetal. A film according to the present invention has a film thickness of around 10-100 μm. As stated above, it adheres to an inorganic nonmetal primarily by the action of van de Waals force, and it can be manufactured by a bonding method using an electroconductive bonding material according to the present invention.

EXAMPLES

Electroconductive bonding materials having the alloy compositions shown in Table 1 were prepared by melting.

Films for a cross-cut test were prepared using these electroconductive bonding materials. First, approximately 0.5-1.2 grams of an electroconductive bonding material were applied to a soldering iron, and separately, one gram of an electroconductive bonding material was placed on a test glass (Shiroenma <white edged glass slide> No. 2 manufactured by Matsunami Glass Ind., Ltd., Item Stock No. S1112). While applying ultrasonic waves at a frequency of 60 kHz using an ultrasonic soldering iron which applies ultrasonic vibration (UNISONIK-M manufactured by Japan Unix Co., Ltd.) and setting the temperature of the tip of the soldering iron to 350° C., the electroconductive bonding material was rubbed on the test glass. A film of the electroconductive bonding material having an area of at least 1 cm$^2$ and a thickness of 50 μm was formed on the test glass.

The cross-cut test was carried out in accordance with JIS K 5600. A film was prepared on a test glass in a manner as stated above and cooled to room temperature, and after two hours had passed, cross-cuts were made at intervals of 3 mm to form a 6×6 grid of cuts (5 squares×5 squares=25 squares) using a cross-cut guide (CCI-3 manufactured by Cotec Corporation). The adhesive tape used for peeling was polyester tape No. 56 manufactured by Sumitomo 3M Ltd. (bonding strength of 5.5 N/cm). Other conditions were in accordance with JIS K 5600-5-6. The condition of the squares after peeling of the adhesive tape was visually observed. The number of peeled squares is shown in Table 1. If the number of peeled squares in this test was less than 10, the bonding strength was considered satisfactory for practical use.

A peeling test for evaluating bonding strength at a high temperature was carried out using a glass substrate having covered with a film of an electroconductive bonding material in the above-described manner by dripping thereon one drop (approximately 50 mm$^3$) of a solution containing 25% rosin in IPA (isopropyl alcohol) from a dropper, then placing the glass substrate on a hot plate at 150° C. and holding it for two minutes. Within 2 hours after cooling to room temperature, ultrasonic cleaning in IPA was carried out for five minutes, and the state of peeling was evaluated as follows. In the present invention, an evaluation of A indicates that reliability after high-temperature exposure is sufficient for practical purposes.

A: No peeling;
B: The electroconductive bonding material peeled on an area of greater than 0% and less than 50% of the area of the film; and
C: The electroconductive bonding material peeled on 50% or greater of the area of the film.

TABLE 1

| No. | Alloy composition | | | | | | | Cross-cut test (number) | Peeling test |
|---|---|---|---|---|---|---|---|---|---|
| | Sn | Zn | In | Sb | Ag | Cu | other | | |
| Ex. 1 | bal. | 0.5 | 3 | 1 | | | | 8 | A |
| Ex. 2 | bal. | 4 | 5 | 0.5 | | | | 8 | A |
| Ex. 3 | bal. | 4 | 9 | 0.3 | | | | 8 | A |
| Ex. 4 | bal. | 4 | 9 | 0.5 | | | | 8 | A |
| Ex. 5 | bal. | 12 | 3 | 1 | | | | 9 | A |
| Ex. 6 | bal. | 11 | 3 | 1 | | | | 8 | A |
| Ex. 7 | bal. | 11 | 9 | 1 | | | | 3 | A |
| Ex. 8 | bal. | 11 | 15 | 0.2 | | | | 9 | A |
| Ex. 9 | bal. | 11 | 15 | 1 | | | | 0 | A |
| Ex. 10 | bal. | 9 | 3 | 2 | | | | 6 | A |
| Ex. 11 | bal. | 9 | 3 | 0.5 | | | | 9 | A |
| Ex. 12 | bal. | 7 | 6 | 1 | | | Ba: 0.05 | 6 | A |
| Ex. 13 | bal. | 7 | 6 | 1 | 1 | | | 8 | A |
| Ex. 14 | bal. | 7 | 6 | 1 | | 0.5 | | 7 | A |
| Ex. 15 | bal. | 7 | 6 | 1 | 1 | 0.5 | Ba: 0.05 | 6 | A |
| Ex. 16 | bal. | 7 | 6 | 1 | | | Y: 0.05 | 7 | A |
| Ex. 17 | bal. | 7 | 6 | 1 | | | Ti: 0.05 | 7 | A |
| Ex. 18 | bal. | 7 | 6 | 1 | | | Ca: 0.05 | 8 | A |
| Comp. 1 | bal. | 15 | | | | | | 24 | A |
| Comp. 2 | bal. | 4 | 5 | | | | | 17 | A |
| Comp. 3 | bal. | 4 | | 1 | | | | 23 | A |
| Comp. 4 | bal. | 3.5 | | 1.25 | | | Al: 0.06 | 21 | A |
| Comp. 5 | bal. | 3.5 | 20 | 3.5 | | | Al: 0.05 | 8 | C |
| Comp. 6 | bal. | 11 | 1 | 1 | | | | 18 | A |
| Comp. 7 | bal. | 11 | 18 | 1 | | | | 7 | C |
| Comp. 8 | bal. | 9 | 3 | 3 | | | | — | — |

Ex: Example; Comp: Comparative Example

As shown in Table 1, in each of Examples 1-18, the number of squares which peeled was less than 10, and the evaluation in the peeling test was A. It was clear that reliability such as bonding strength after high-temperature exposure which was sufficient for practical purposes was obtained.

Comparative Example 1 which did not contain In and Sb, Comparative Example 2 which did not contain Sb, Comparative Examples 3 and 4 which did not contain In, and Comparative Example 6 for which the In content was below the range of the present invention all had peeling of at least 10 squares in the cross-cut test. Comparative Example 5 (corresponding to Example No. 3 in Patent Document 1) and Comparative Example 7, for both of which the In content was greater than the range of the present invention, had less than 10 squares which peeled, but the reliability after high-temperature exposure was evaluated as C, and reliability was inferior. The electroconductive bonding material after this evaluation curled up into a ball due to surface tension, and it peeled under zero load. Comparative Example 8 for which the Sb content was higher than the range of the present invention had a high liquidus temperature and its wettability to glass was poor, so it was not possible to prepare a film on the test glass. Therefore, neither the cross-cut test nor the peeling test could be carried out.

Thus, an electroconductive bonding material according to the present invention clearly has reliability such as bonding strength after high-temperature exposure with respect to an inorganic nonmetal such as glass or a ceramic, which cannot be obtained at all with the prior art.

FIG. 1 is a graph showing the relationship between the In content and results of the cross-cut test and the peeling test. In the FIGURE, the results for Sn-11Zn-xIn-1Sb alloys (Examples 6, 9, and 10 and Comparative Examples 6 and 7) are plotted. From FIG. 1, it is clear that the results of the cross-cut test were good when the In content was in the range of 2.0-18%. In particular, the effect was quite marked when the In content was in the range of 9-15%. The evaluation in the peeling test was A when the In content was in the range of 1-16%. Accordingly, it was found that reliable bonding strength was obtained both at room temperature and after high-temperature exposure when the In content is in the range of 2.0-16%.

An electroconductive bonding material according to the present invention has markedly improved peeling strength with respect to an inorganic nonmetal particularly after high-temperature exposure compared to the material disclosed in Patent Document 1. Therefore, an electroconductive bonding material according to the present invention can provide a bonding strength after high-temperature exposure and accordingly reliability to an extent which is satisfactory for practical purposes even when the amount of an electroconductive bonding material which is used is decreased under conditions in which the size of electronic parts and the like is decreased and the size of electrodes such as ITO electrodes is also decreased. In addition, the electroconductive bonding material has good wettability and it can be easily adhered to an inorganic nonmetal, so it can greatly increase working efficiency.

Furthermore, an electroconductive bonding material according to the present invention is adhered to an inorganic nonmetal primarily by van de Waals force. Therefore, it can be peeled off at a high temperature of at least the melting point of the electroconductive bonding material without contaminating the bonded interface. This fact was actually confirmed with the materials in Examples 1-18. Accordingly, an electroconductive bonding material according to the present invention has excellent recyclability and is extremely gentle on the environment.

The invention claimed is:

1. A film adhered to a surface, wherein the film is formed from an electroconductive bonding material having an alloy composition consisting of, in mass %:
   Zn: 0.1-15%;
   In: 2-16%;
   Sb: greater than 0% to at most 2%;
   optionally Ag: 0-2%, Cu: 0-1%, and at least one element selected from the group consisting of Y, Ba, Ti, and Ca in a total amount of 0-0.15%; and
   the remainder Sn,
   wherein the film is adhered to the surface without formation of an intermetallic compound therebetween.

2. The film as set forth in claim 1, wherein the surface is a surface of an inorganic nonmetal.

3. The film as set forth in claim 1, wherein the Sb content is 0.1-2%.

4. The film as set forth in claim 1, wherein the In content is 3-15% and the Sb content is 0.2-1%.

5. The film as set forth in claim 1, wherein a thickness of the film is 10-100 µm.

6. A glass substrate having a surface covered with a film formed from an electroconductive bonding material having an alloy composition consisting of, in mass %:
   Zn: 0.1-15%;
   In: 2-16%;
   Sb: greater than 0% to at most 2%;
   optionally Ag: 0-2%, Cu: 0-1%, and at least one element selected from the group consisting of Y, Ba, Ti, and Ca in a total amount of 0-0.15%; and
   the remainder Sn,
   wherein the film is adhered to the surface without formation of an intermetallic compound therebetween.

7. The glass substrate as set forth in claim 6, wherein the Sb content is 0.1-2%.

8. The glass substrate as set forth in claim 6, wherein the In content is 3-15% and the Sb content is 0.2-1%.

* * * * *